(12) United States Patent
Fersch (10) Patent No.: US 11,592,561 B2
(45) Date of Patent: Feb. 28, 2023

(54) LIDAR SYSTEM

(71) Applicant: Robert Bosch GmbH, Stuttgart (DE)

(72) Inventor: Thomas Fersch, Munich (DE)

(73) Assignee: Robert Bosch GmbH, Stuttgart (DE)

( * ) Notice: Subject to any disclaimer, the term of this patent is extended or adjusted under 35 U.S.C. 154(b) by 902 days.

(21) Appl. No.: 16/349,180

(22) PCT Filed: Oct. 30, 2017

(86) PCT No.: PCT/EP2017/077814
§ 371 (c)(1),
(2) Date: May 10, 2019

(87) PCT Pub. No.: WO2018/086945
PCT Pub. Date: May 17, 2018

(65) Prior Publication Data
US 2019/0265358 A1    Aug. 29, 2019

(30) Foreign Application Priority Data

Nov. 11, 2016 (DE) .......................... 102016222138.8

(51) Int. Cl.
| | |
|---|---|
| *G01C 3/08* | (2006.01) |
| *G01S 17/32* | (2020.01) |
| *G01S 7/48* | (2006.01) |
| *G01S 7/4911* | (2020.01) |
| *G01S 17/10* | (2020.01) |
| *G01S 17/42* | (2006.01) |

(52) U.S. Cl.
CPC ............ *G01S 17/32* (2013.01); *G01S 7/4808* (2013.01); *G01S 7/4911* (2013.01); *G01S 17/10* (2013.01); *G01S 17/42* (2013.01)

(58) Field of Classification Search
CPC ...... G01S 17/32; G01S 7/4808; G01S 7/4911; G01S 7/10
See application file for complete search history.

(56) References Cited

U.S. PATENT DOCUMENTS

| | | |
|---|---|---|
| 5,013,151 A | 5/1991 | Hughes |
| 5,745,437 A | 4/1998 | Wachter et al. |

(Continued)

FOREIGN PATENT DOCUMENTS

| | | |
|---|---|---|
| CN | 101688914 A | 3/2010 |
| CN | 104731535 A | 6/2015 |

(Continued)

OTHER PUBLICATIONS

International Search Report for PCT/EP2017/077814, dated Jan. 30, 2018.

*Primary Examiner* — Mark Hellner
(74) *Attorney, Agent, or Firm* — Norton Rose Fulbright US LLP; Gerard Messina (57) ABSTRACT

A LIDAR system is described for detecting surroundings, including a laser light source for emitting a laser light, a receiving device for receiving a laser light reflected by the surroundings, and a control device for activating the laser light source, the control device being configured to activate the laser light source for emitting a continuous light beam and to continually modulate the emitted light beam, so that the light beam includes a multitude of successive codes.

13 Claims, 5 Drawing Sheets

(56) References Cited

U.S. PATENT DOCUMENTS

| | | | | |
|---|---|---|---|---|
| 6,580,497 | B1 * | 6/2003 | Asaka | ............ G01S 7/493 |
| | | | | 356/28.5 |
| 10,620,300 | B2 * | 4/2020 | Sharma | ............ G01S 7/483 |
| 2002/0167654 | A1 | 11/2002 | Shirai et al. | |
| 2003/0125855 | A1 | 7/2003 | Breed et al. | |

FOREIGN PATENT DOCUMENTS

| | | | | |
|---|---|---|---|---|
| CN | 105122081 A | 12/2015 | | |
| DE | 102014118055 A1 | 6/2016 | | |
| DE | 102016011299 A1 * | 3/2018 | ............ | G01S 17/931 |
| EP | 2963445 A2 | 1/2016 | | |
| WO | WO 2016091625 A1 * | 6/2016 | ............ | G01S 7/4817 |

\* cited by examiner

LIDAR SYSTEM

FIELD OF THE INVENTION

The present invention relates to a LIDAR system for measuring a distance with the aid of laser light. The present invention also relates to a method for detecting surroundings with a LIDAR system.

BACKGROUND INFORMATION

Figure 1:
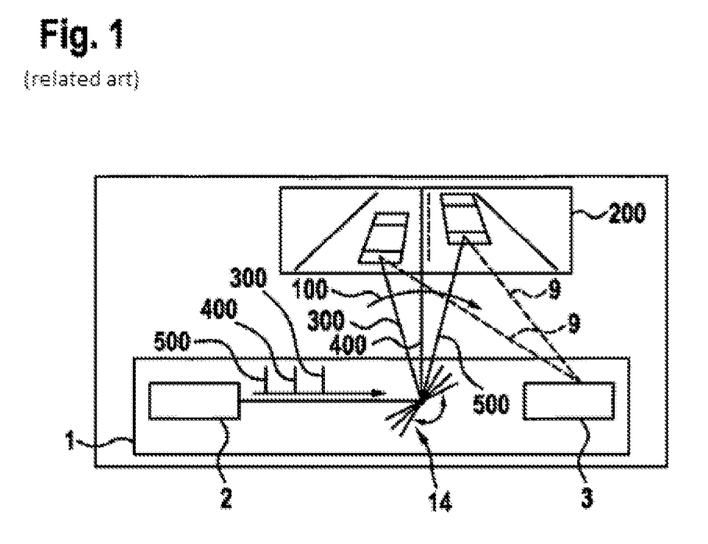
FIG. 1 schematically shows a view of a LIDAR system according to the related art.

LIDAR sensors are often used in vehicles in order to survey the surroundings of the vehicle. In the process, pulsed lasers that have a high peak power are used. Such a system is schematically depicted in FIG. 1. FIG. 1 shows a LIDAR system 1, including a laser light source 2 and a receiving device 3. In this system, it is provided that a laser light is emitted via laser light source 2 to surroundings 200, laser light 9 reflected from surroundings 200 being receivable by receiving device 3.

It is provided that the laser light is emitted exclusively pulsed. Thus, for example, a first pulse 300, a second pulse 400 and a third pulse 500 are shown in FIG. 1. In addition, the emitted laser light is deflected by a deflection device 14 in order to generate a scan movement 100. Such a system, however, has the following disadvantages:

- Once each light pulse 300, 400, 500 is emitted, it is necessary to wait a certain period of time in order for all potential reflections of emitted light pulses 300, 400, 500 to be received by receiving device 3. If this is disregarded, ambiguities may result which may result in false results. Thus, system 1 is slow and inflexible.
- LIDAR system 1, like any system that emits individual pulses, may be very easily disrupted. This may take place unintentionally as a result of other LIDAR systems in the same wave length range, as a result of truck toll bridges, as they are installed, for example, on German expressways, or as a result of speed monitoring stations. A disruption as the result of a malicious attack is also conceivable. Such malicious attacks have already been discussed in the related art.
- The eye safety of such systems that use a laser must, in general, be assessed for the worst case scenario. In conventional systems, a single high-energy light pulse may not impair eye safety, when considering a worst-case scenario; however, the possibility of the combination of the energy of multiple pulses may exist and may result in very strict limitations in the transmission power of laser light source 2. Consequently, known LIDAR systems 1 are also limited hereby.
- The generation of very high peak powers requires very high currents, which may be generated only by expensive hardware. In addition, extensive problems with regard to electromagnetic compatibility arise as a result of high currents.

SUMMARY

The LIDAR system according to the present invention allows for a rapid and flexible detection of surroundings. To this end, cost-efficient hardware components, in particular, such as SPAD diodes may be used. Peak powers lower than those in the related art are also used in order to achieve at least equally high detection probabilities. Thus, the LIDAR system according to the present invention is advantageous with regard to eye safety.

The LIDAR system according to the present invention includes a laser light source for emitting a laser light, a receiving device for receiving laser light and a control device for activating the laser light source. In this system, it is provided that the laser light emitted by the laser light source is reflected by surroundings in order to be received by the receiving device. The control device is configured to activate the laser light source for emitting a continuous light beam and to continuously modulate the emitted light beam. In this way, the light beam includes a multitude of successive codes. The codes therefore allow for the possibility of carrying out a chronological assignment of the light beam. Thus, it is not necessary, as in the related art, to resort to individual light pulses; instead, a continuous light beam may be emitted. Nevertheless, the same possibilities exist as in the related art, so that distance measurements, in particular, may be carried out. The distance measurements may be carried out over the transit time of the laser light. The point in time of the emission of the laser light is known, since, as previously described, each laser light is coded. This is also possible, in particular, when multiple emitted light beams are superposed.

The subclaims show preferred refinements of the present invention.

The codes exhibit preferably a minimum cross-correlation and/or a maximum orthogonality. This means that the codes are preferably dissimilar, so that a confusion of the codes among one another is ruled out. It is provided, in particular, that the codes, correlated with themselves, exhibit a sharp maximum with low side lobes. This is referred to as optimal autocorrelation. In this way, the codes may be safely and reliably extracted from the reflected laser light. This enables safe and reliable distance measurements.

The laser light source is preferably designed to emit the laser light along a two-dimensional space. This means that a laser light may be emitted from the laser light source at different angles. The two-dimensional space therefore represents a limitation of the aforementioned angle. A scan movement is generatable as a result of the emission at different angles. In this way, the surroundings may be continuously scanned, the scanning taking place in a linear or monoplanar manner as a result of the scan movement. This enables, in particular, a scan movement to be carried out with continuously emitted laser light, which is not possible in the related art. In addition, the laser light source may include, in particular, a deflection device, the deflection device being able to be implemented, in particular, by a mirror. By tipping the mirror, it is possible to implement different angles at which the laser light is emitted from the laser light source.

The codes are generated preferably by different sequences of activation and deactivation of the laser light source. Thus, a modulation is achieved by on-off keying, since a bit may be implemented by the activation and deactivation of the laser light source. Thus, a logic 1 may, in particular, be represented by an activated laser light source and a logic 0 may be represented by a deactivated laser light source. By repeatedly activating and deactivating the laser light source, it is possible to generate a code that has a fundamentally arbitrary bit length.

A duration of each code is preferably between 0.5 microseconds and 1.5 microseconds. It is particularly preferably provided that the duration is 1.0 microseconds. A code preferably has a length of 127 bits. A code having such a length may be advantageously optimally represented in the previously described duration. The described length and the described duration ensure that the individual codes may be safely and reliably differentiated when the reflected laser light is detected by the receiving device. The above described duration is also optimal for carrying out distance measurements based on the transit time of the laser light, since here, an excessively long duration would result in blurred measurements.

The codes are preferably determined with the aid of N-sequence and/or of Golden codes and/or of Kasami codes and/or of Barker codes and/or of Ipatov sequences. These methods are known, in principle, from the related art. According to any of these methods, a set of eight different codes may preferably be created, the codes having preferably the previously described length of 127 bits. To convert these codes in the continuous light beam, the control device is preferably configured to activate and to deactivate the laser light source, similar to the code. The continuous light beam is modulated preferably in such a way that the codes, in particular, the previously described eight different codes, are sent either one directly after the other and repeatedly or with a variable pause between the individual codes. The variable pauses may preferably be lengthened, should this be necessary for the electronic signal processing of the reflected laser light received by the receiving device. The variable pauses may also be shortened in order to thereby increase an accuracy of the measurement.

The receiving device includes preferably at least one, in particular, a single photodiode and/or a photodiode array. The reflected light is receivable by the photodiode. The photodiode array allows for the reception of reflected light beams over a large area, thereby enabling a safe and reliable detection of the emitted light.

It is preferably provided that the photodiode and/or the photodiode array include(s) a PIN diode and/or an APD diode and/or a SPAD diode. A PIN diode is understood to mean a diode that includes a p-doped layer and an n-doped layer, an intrinsic layer being situated between the p-doped layer and the n-doped layer. An intrinsic layer is understood to mean a layer that is not doped or merely weakly doped, so that this layer is mainly intrinsically conducting. An APD diode is understood to mean an avalanche photodiode. The photodiode and/or the photodiode array particularly advantageously includes and/or include a SPAD diode. The use of such a diode is enabled only by the modulation of the continuous light beam. This is advantageous in that SPAD diodes may be very cost-efficiently manufactured.

In one preferred specific embodiment of the present invention, the receiving device includes a filter for each code. In this case, it is provided that each filter, given an input signal and the assigned code, outputs a maximum output signal and otherwise suppresses the input signal. Thus, it may be established, based on the output signals of each of the filters, which code is included by the light detected by the receiving device. Thus, it is determinable when the reflected light has been emitted, thereby enabling a distance measurement based on the transit time method. It is particularly advantageously enabled that, given such an input signal, a filter outputs a maximum output signal, which includes two particular successive codes. In this way, a greater signal energy is evaluated, thereby increasing a detection probability of large areas. The horizontal, spatial resolution, as well as the accuracy of the depth information, are reduced, however. Thus, it is, in particular, advantageous if the aforementioned fine filters are situated downstream from the coarse filters just described, in order in this way to carry out a step-by-step detection.

The filters are particularly advantageously optimum filters. Optimum filters advantageously assist in optimizing the signal-to-noise ratio. Optimum filters are therefore optimally suited in the use of LIDAR systems, which are generally confronted with only low signal-to-noise intervals.

The present invention also relates to a method for detecting surroundings, which includes the following steps: a laser light is initially emitted with the aid of a laser light source. Subsequently, light reflected by the surroundings is received with the aid of a receiving device. In this way, the laser light previously emitted and reflected by the surroundings, in particular, is detectable. This allows a distance measurement method to be carried out based on the transit time of the emitted light. It is provided that the laser light is emitted in continuous laser beams, so that the laser light source is activated for emitting a continuous light beam. It is further provided that the emitted continuous light beam is continuously modulated, so that the light beam includes a multitude of successive codes. This enables therefore the use of a continuous light beam for detecting the surroundings, a distance measurement through the run-in period being simultaneously enabled.

DETAILED DESCRIPTION

Figure 2:
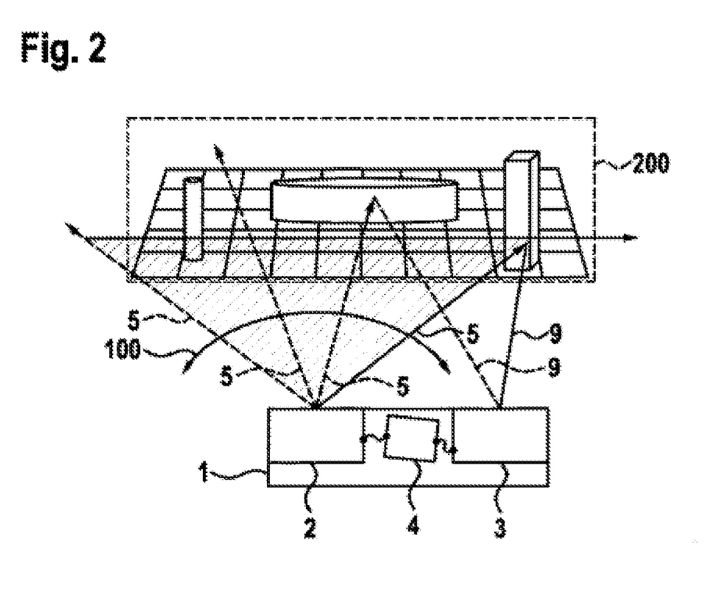
FIG. 2 schematically shows a view of a LIDAR system according to one exemplary embodiment of the present invention.

FIG. 2 schematically shows a LIDAR system 1 according to one exemplary embodiment of the present invention. LIDAR system 1 includes a laser light source 2, a receiving device 3 and a control device 4. In this system, it is provided that a laser light is emittable by laser light source 2. The emitted laser light has, in particular, the shape of a continuous laser beam 5. Continuous laser beam 5 is, in particular, generatable by the activation of laser light source 2 by control device 4. In FIG. 2, various positions of continuous light beam 5 are depicted, which may be generated by a deflection device 14, similar to the related art shown in FIG. 1, in order to carry out a scan movement 100.

Continuous light beam 5 strikes surroundings 200 and is reflected by the surroundings. Reflected laser light 9 is detectable by receiving device 3. To be able to carry out a distance measurement based on reflected laser light 9, it is necessary to know when reflected laser light 9 was originally emitted by laser light source 2. Such a piece of information is to be derived, in particular, from codes. For this purpose, it is provided that control device 4 is configured to continuously modulate emitted light beam 5, so that light beam 5 includes a multitude of successive codes. If receiving device 3 detects reflected laser light 9, then receiving device 3 is also configured to determine the code of reflected laser light 9. Based on this code, it may be ascertained when reflected laser light 9 was originally emitted by laser light source 2. It is also discernible whether reflected laser light 9 has even been emitted by laser light source 2, so that a disruption of LIDAR system 1 is avoided or at least impeded.

The emitted code sequence may be fully controlled by control device 4. Control device 4 is configured, in particular, to activate and to deactivate laser light source 2, in order to thus generate the aforementioned code sequences. By contrast, it is not known and also not controllable, how these codes are received by receiving device 3. Reflected laser light 9 may include individual codes, individual code segments, or also a superposition of various codes. In order to nevertheless identify these codes, receiving device 3 includes a multitude of filters 8, as is depicted in FIG. 3.

Figure 3:
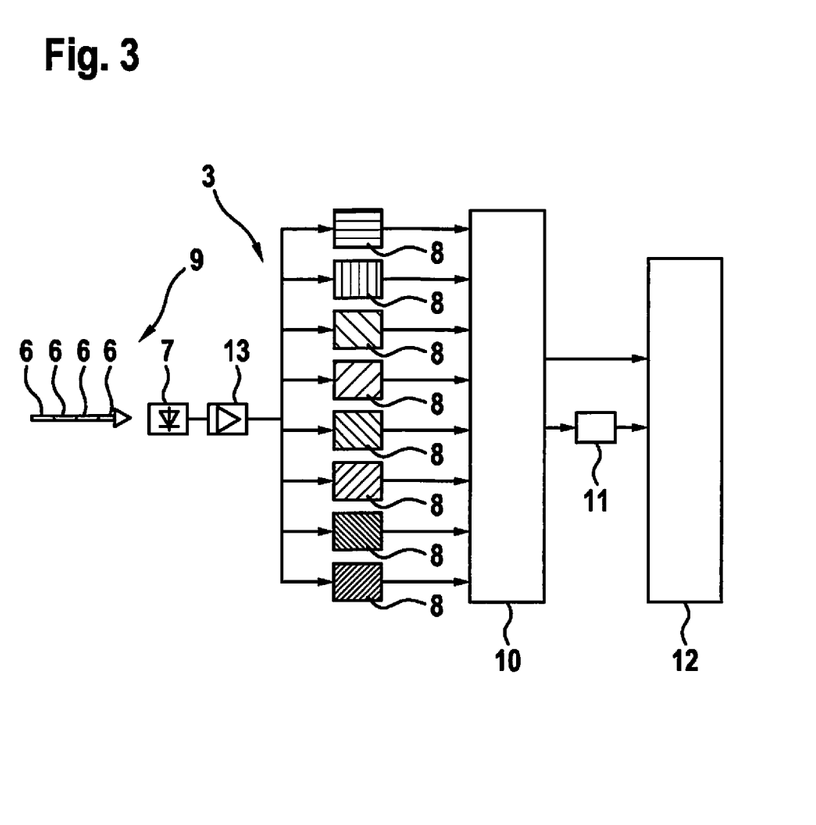
FIG. 3 schematically shows an image of a first alternative of a receiving device of the LIDAR system according to the exemplary embodiment of the present invention.

FIG. 3 schematically shows a structure of a first alternative of receiving device 3. Receiving device 3 includes a photodiode, where photodiode 7 may also be an array of photodiodes. Reflected laser light 9 is detectable by photodiode 7, reflected laser light 9 including a multitude of codes 6. Photodiode 7 is also configured to convert detected reflected laser light 9 into an electrical signal. Photodiode 7 is particularly advantageously a SPAD diode. Situated downstream from photodiode 7 is a signal conditioning element 13, which enables a preparation of the signal by photodiode 7 for a subsequent filtering. Signal conditioning element 13 may include, in particular, a signal amplifier.

Receiving device 3 in the first alternative shown in FIG. 3 further includes a multitude of filters 8. Filters 8 are, in particular, optimum filters. In this case, it is provided that each filter 8 is assigned exactly one code 6, so that exactly one filter 8 is present for each code 6 that is generatable by laser light source 2. In this case, it is provided that each filter 8 correlates the code 6 assigned to it with the signal delivered by signal conditioning element 13. In this way, each filter 8 outputs a maximum output signal when the input signal corresponds to assigned code 6. The input signal is otherwise suppressed.

Situated downstream from filters 8 is a threshold value decision circuit 10. Threshold value decision circuit 10 is used to decide whether an output signal from each of filters 8 is sufficient, so that the presence of code 6 assigned to each filter 8 in detected laser light 9 may be deduced. Should this be the case, recognized code 6 is then delivered directly to a final processing device 12. A point in time determination also takes place via a time module 11, so that the point in time at which recognized code 6 is received is deliverable by time module 11 of processing device 12. Thus, processing device 12 knows which code 6 has been received when by receiving device 3. Since the point in time of the emission of respective code 6 is also known, it is possible, based on the transit time of the light that includes respective code 6, to determine a distance of the obstacle within surroundings 200 that reflected the light.

Each code 6 is preferably 1.0 microseconds long. Each code 6 also has 127 bits. Since a correlation takes place within filters 8, it is provided that all existing codes 6 are preferably dissimilar. This means that codes 6 exhibit a maximum orthogonality and/or a minimum cross-correlation. At the same time, it is preferably provided that an autocorrelation of codes 6 results in a sharp maximum with low side lobes, i.e. an optimum autocorrelation is present. Codes 6 are determined preferably with the aid of N-sequence and/or of Golden codes and/or of Kasami codes and/or of Barker codes and/or of Ipatov sequences. These methods are known, in principle, from the related art and are therefore not explained in further detail.

Figure 4:
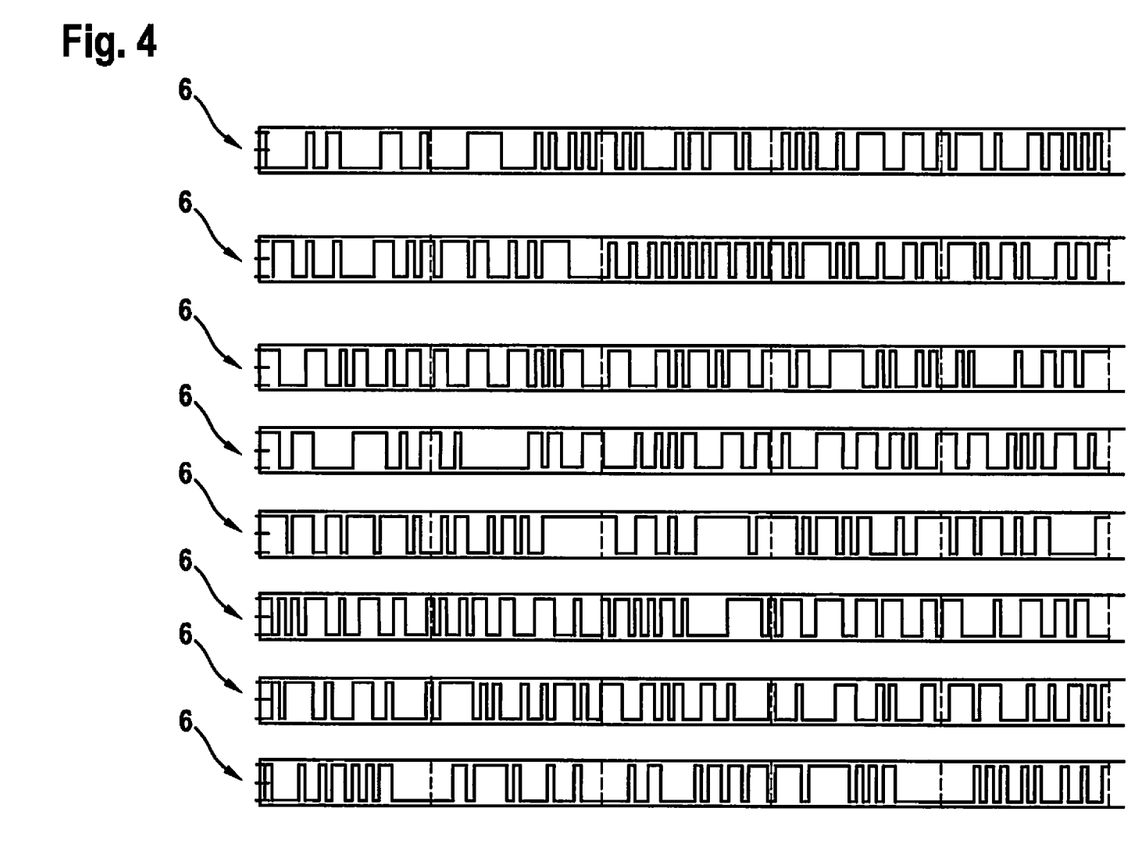
FIG. 4 schematically shows an image of different codes, which are used in the LIDAR system according to the exemplary embodiment of the present invention.

FIG. 4 shows by way of example a set of eight different codes 6, all of which are 127 bits long and have been generated with the aid of the Gold codes method. The eight codes 6 depicted in FIG. 4 are emitted preferably in succession and repeatedly within continuous light beam 5. Alternatively, variable pauses are provided between individual codes 6. It is advantageous, in particular, that by lengthening the pauses, more time may be provided for an electronic signal processing as previously described, whereas an accuracy of the distance measurement may be increased by shortening the pauses.

If emitted light beam 5 is continuously modulated with codes 6 shown in FIG. 4, a sequence of eight different codes 6, in particular, is emitted, this sequence subsequently being repeated. If these eight codes 6 are detected in the same order by receiving device 3, then a flat equidistant object is situated in surroundings 200. A case is shown in FIG. 5, in which an additional obstacle is present in front of the aforementioned object.

Figure 5:
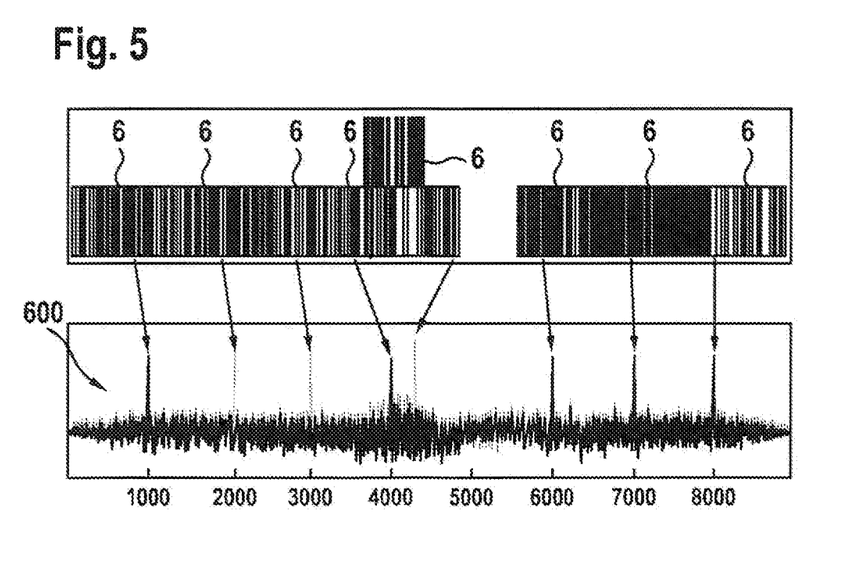
FIG. 5 schematically shows an image of a signal processing by the receiving device according to the first alternative.

In FIG. 5, it is schematically shown how codes 6 are received by receiving device 3. Also shown is a superposition of output signals 600 of all filters 8. Due to the obstacle, a fifth emitted code 6 is detected simultaneously with a detection of fourth emitted code 6. This stems from the fact that the obstacle results in a shorter transit time of that part of emitted light beam 5 that strikes the obstacle and is thus reflected earlier than residual light beam 5.

It is apparent from FIG. 5 that first emitted code 6 is received at a first point in time 1000, since here the associated filter 8 exhibits a maximum in its output signal. Second emitted code 6 is received at a second point in time 2000, third emitted code 6 is received at a third point in time 3000 and fourth emitted code 6 is received at a fourth point in time 4000. In this case, it is provided that one microsecond has elapsed in each case between first point in time 1000 and second point in time 2000, between second point in time 2000 and third point in time 3000, as well as between third point in time 3000 and fourth point in time 4000, which corresponds to a duration of exactly one code 6.

No code 6 is received, however, at a fifth point in time 5000. Instead, an additional code 6 is received shortly after fourth point in time 4000. Thus, fourth emitted code 6 and fifth emitted code 6 overlap which, however, is recognizable by filters 8. The respectively emitted sixth code 6, seventh code 6 and eighth code 6 are in turn received at a sixth point in time 6000, at a seventh point in time 7000 and at an eighth point in time 8000, with no overlap. Processing device 12 is thus able to determine that a closer obstacle is situated in front of a more distant obstacle. In addition, the position of the closer obstacle that resulted in the premature detection of fifth emitted code 6 is ascertainable based on scan movement 100.

In this way, a differential velocity between LIDAR system 1 and a recognized obstacle may, in principle, also be determined. Since the code duration of emitted code 6 is known, in particular, is 1.0 microseconds, the aforementioned differential velocity may be determined from a lengthening or shortening of code 6 received by receiving device 3. If, for example, it is recognized that the code duration of a received code 6 is lengthened by 0.66 picoseconds, then it may be deduced on the basis of the vacuum light velocity that the recognized obstacle moves away from LIDAR system 1 at a velocity of 100 meters per second if a code duration of emitted code 6 was 1.0 microseconds.

An angle of inclination of the detected obstacle may preferably also be determined. If emitted light beam 5 is panned over an inclined surface via scan movement 100, the result then is again a lengthening or shortening of the received code, similar to the above cited case of the relative velocity. If, for example, a code 6 is emitted at a code duration of 1.0 microseconds and a delay or shortening of the code duration of received code 6 of 3.3 nanoseconds is determined, then an inclination of 45 degrees may be deduced, again based on the vacuum light velocity, if during the code duration of 1.0 microseconds an area of 50 centimeters in length is scanned by scan movement 100.

Figure 6:
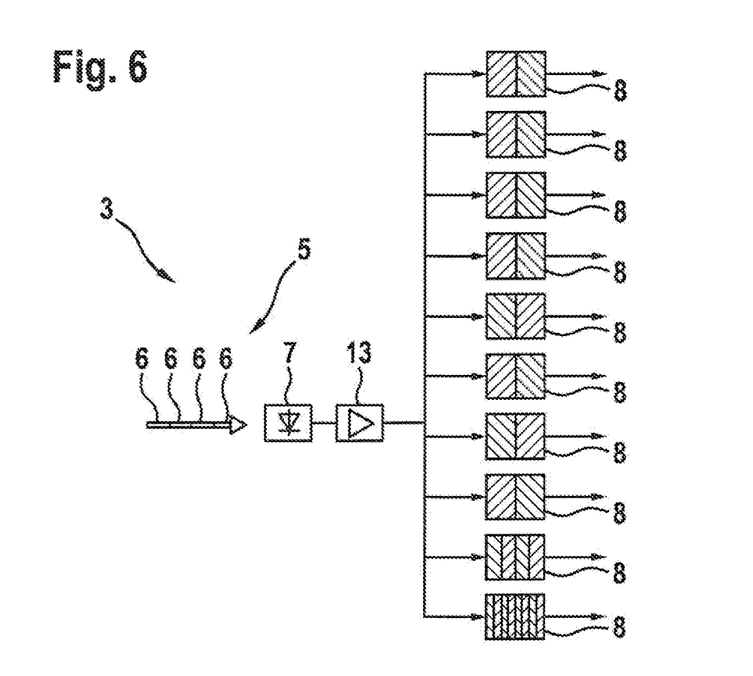
FIG. 6 schematically shows an image of a second alternative of a receiving device of the LIDAR system according to the exemplary embodiment of the present invention.

FIG. 6 schematically shows a second alternative of receiving device 3 of LIDAR system 1 according to the exemplary embodiment of the present invention. In the second alternative, each filter 8 is not checked for a single code 6, but for a sequence of different codes 6. Thus, filters 8 are present, which check for a sequence of two different codes 6 or for a sequence of four different codes 6 or for a sequence of eight different codes 6. The structure of receiving device 3 is otherwise identical to FIG. 6, so that the representation of threshold value decision circuit 10, of time module 11 and of processing device 12 may be dispensed with. Filters 8 shown in FIG. 3 and filters 8 shown in FIG. 6 may advantageously be connected in series.

Figure 7:
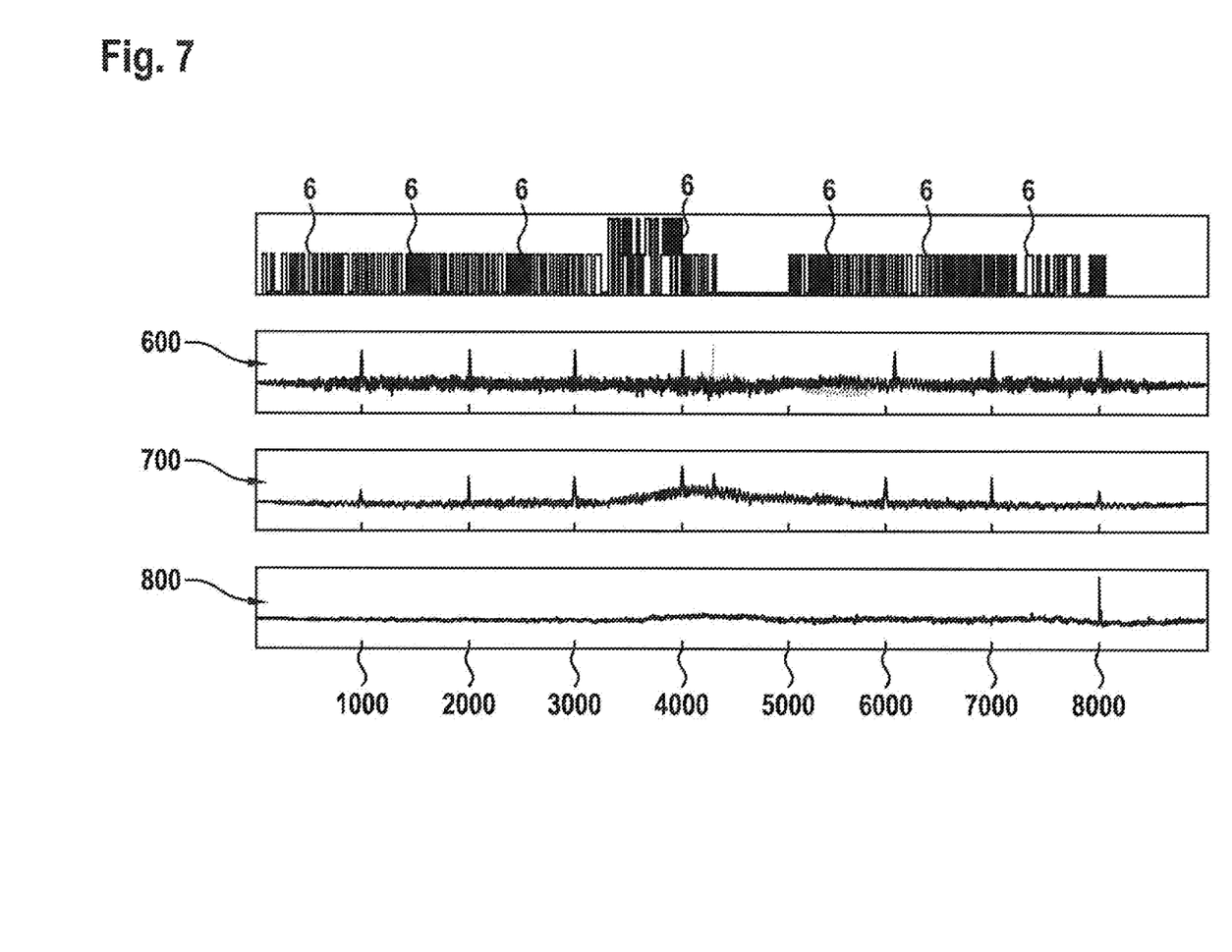
FIG. 7 schematically shows an image of a signal processing by the receiving device according to the second alternative.

FIG. 7 schematically shows the same as FIG. 5, output signals 700, 800 of a part of filters 8 from FIG. 6 being depicted. Thus, first output signals 600 of filters 8 from FIG. 3 correspond to the output signals of filters 8, to which merely a single code 6 is assigned. Second output signals 700 correspond to the output signals of those filters 8, to which 2 codes 6 are assigned. Such filters 8 are shown in FIG. 6, in particular, by uppermost eight filters 8. Finally, third output signal 800 shows the output signal of a filter 8, to which eight codes 6 are assigned. Such a filter 8 is shown at the lowermost position in FIG. 6.

It is apparent from FIG. 7 that a signal-to-noise ratio is improved with a higher number of assigned codes 6. At the same time, a resolution is reduced. If, therefore, filters 8 shown in FIG. 6 and in FIG. 3 are all connected in parallel, then the initial attempt may be made to record a safe signal, based on coarse-grained filters 8, i.e. based on filters 8 to which multiple codes 6 are assigned. Subsequently, the attempt may be made to achieve a high degree of accuracy using fine-grained filters 8, i.e., using filters 8 to which fewer codes 6 or only one code 6 are/is assigned.

Thus, it is apparent that LIDAR system 1 according to the exemplary embodiment of the present invention, on the one hand, offers a high degree of reliability and accuracy in distance measurement and, on the other hand, may be disrupted only with difficulty or not at all by external sources. In the process, the use of pulsed lasers is completely dispensed with.

What is claimed is:

1. A LIDAR system for detecting surroundings, comprising:
   a laser light source for emitting a laser light;
   a receiving device for receiving the laser light reflected by the surroundings; and
   a control device for activating the laser light source, wherein the control device activates the laser light source to emit a continuous light beam and continually modulate the emitted light beam, so that the light beam includes a multitude of successive codes,
   wherein the codes are emitted in succession and repeatedly within the continuous light beam,
   wherein the codes are generated by different sequences of an activation and deactivation of the laser light source.

2. The LIDAR system as recited in claim 1, wherein the codes exhibit a minimum cross correlation.

3. The LIDAR system as recited in claim 1, wherein the laser light source emits the laser light at least along a two-dimensional space, in order to carry out a scan movement of the laser light.

4. The LIDAR system as recited in claim 1, wherein the codes have a time duration of between 0.5 microseconds and 1.5 microseconds.

5. The LIDAR system as recited in claim 1, wherein the codes have at least one of a time duration of 1.0 microseconds or a length of 127 bits.

6. The LIDAR system as recited in claim 1, wherein the codes are determined with the aid of at least one of N-sequence, Golden codes, Kasami codes, Barker codes, and Ipatov sequences.

7. The LIDAR system as recited in claim 1, wherein the receiving device includes at least one of at least one photodiode or a photodiode array.

8. The LIDAR system as recited in claim 7, wherein the at least one of the at least one photodiode and the photodiode array includes at least one of a PIN diode, an APD diode, and a SPAD diode.

9. A LIDAR system for detecting surroundings, comprising:
   a laser light source for emitting a laser light;
   a receiving device for receiving the laser light reflected by the surroundings; and
   a control device for activating the laser light source, wherein the control device activates the laser light source to emit a continuous light beam and continually modulate the emitted light beam, so that the light beam includes a multitude of successive codes,
   wherein the codes are emitted in succession and repeatedly within the continuous light beam,
   wherein the receiving device includes a filter for each code.

10. The LIDAR system as recited in claim 9, wherein the filters include optimum filters.

11. A method for detecting surroundings, comprising:
   emitting a laser light with the aid of a laser light source; and
   receiving the laser light reflected by the surroundings with the aid of a receiving device;
   activating the laser light source to emit a continuous light beam; and
   continuously modulating the emitted continuous light beam, so that the light beam includes a multitude of successive codes, wherein the codes are emitted in succession and repeatedly within the continuous light beam,
   wherein the codes are generated by different sequences of an activation and deactivation of the laser light source.

12. The LIDAR system as recited in claim 1, wherein the codes exhibits a maximum orthogonality.

13. A method for detecting surroundings, comprising:
   emitting a laser light with the aid of a laser light source; and
   receiving the laser light reflected by the surroundings with the aid of a receiving device;
   activating the laser light source to emit a continuous light beam; and
   continuously modulating the emitted continuous light beam, so that the light beam includes a multitude of successive codes, wherein the codes are emitted in succession and repeatedly within the continuous light beam, wherein the receiving device includes a filter for each code.

* * * * *